T. MASEL.
DOUGH DIVIDER.
APPLICATION FILED APR. 7, 1911.
1,021,157.
Patented Mar. 26, 1912.
4 SHEETS—SHEET 1.
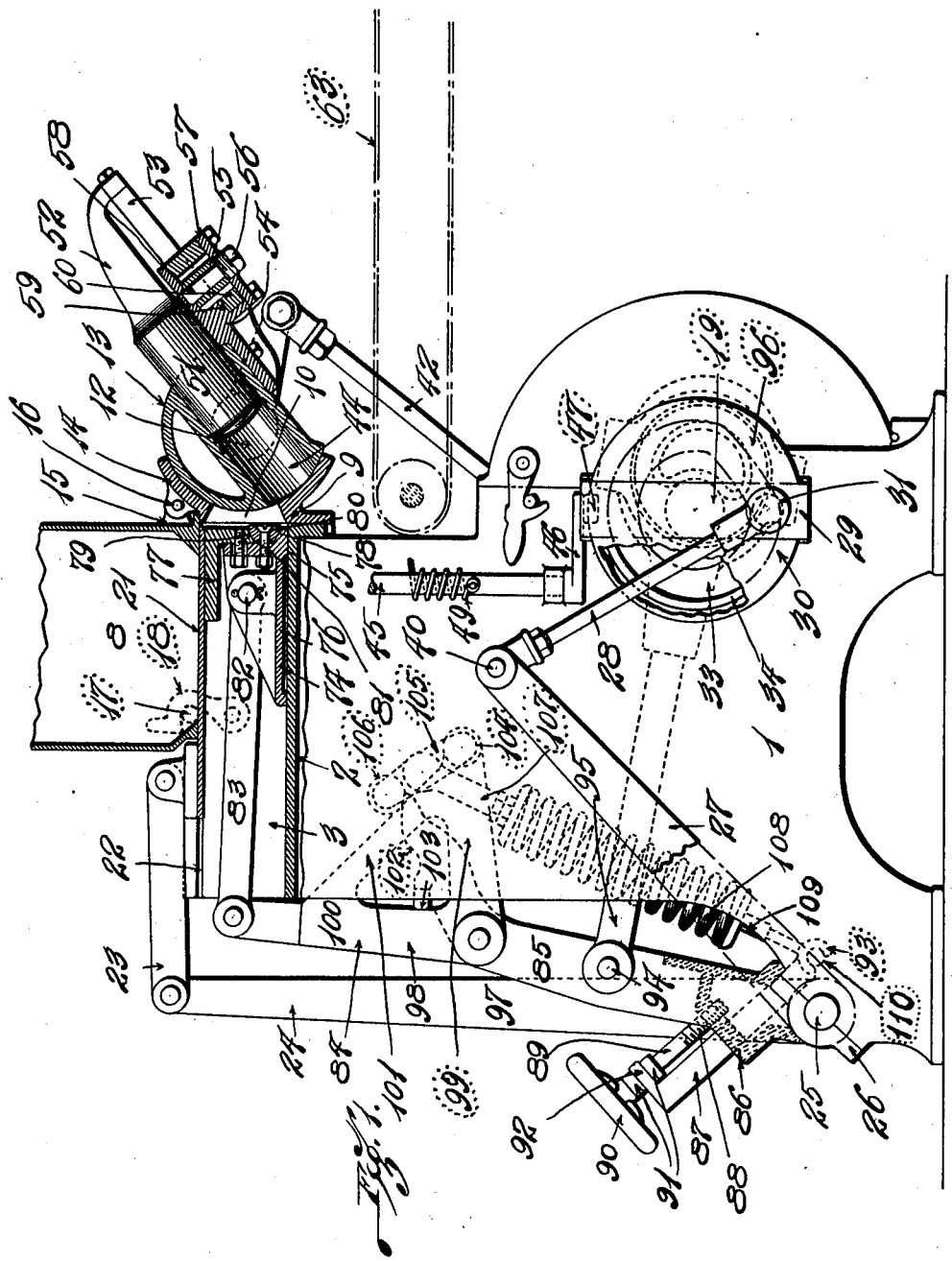
WITNESSES.
INVENTOR.
THEODORE MASEL.

T. MASEL.
DOUGH DIVIDER.
APPLICATION FILED APR. 7, 1911.
1,021,157.
Patented Mar. 26, 1912.
4 SHEETS—SHEET 2.
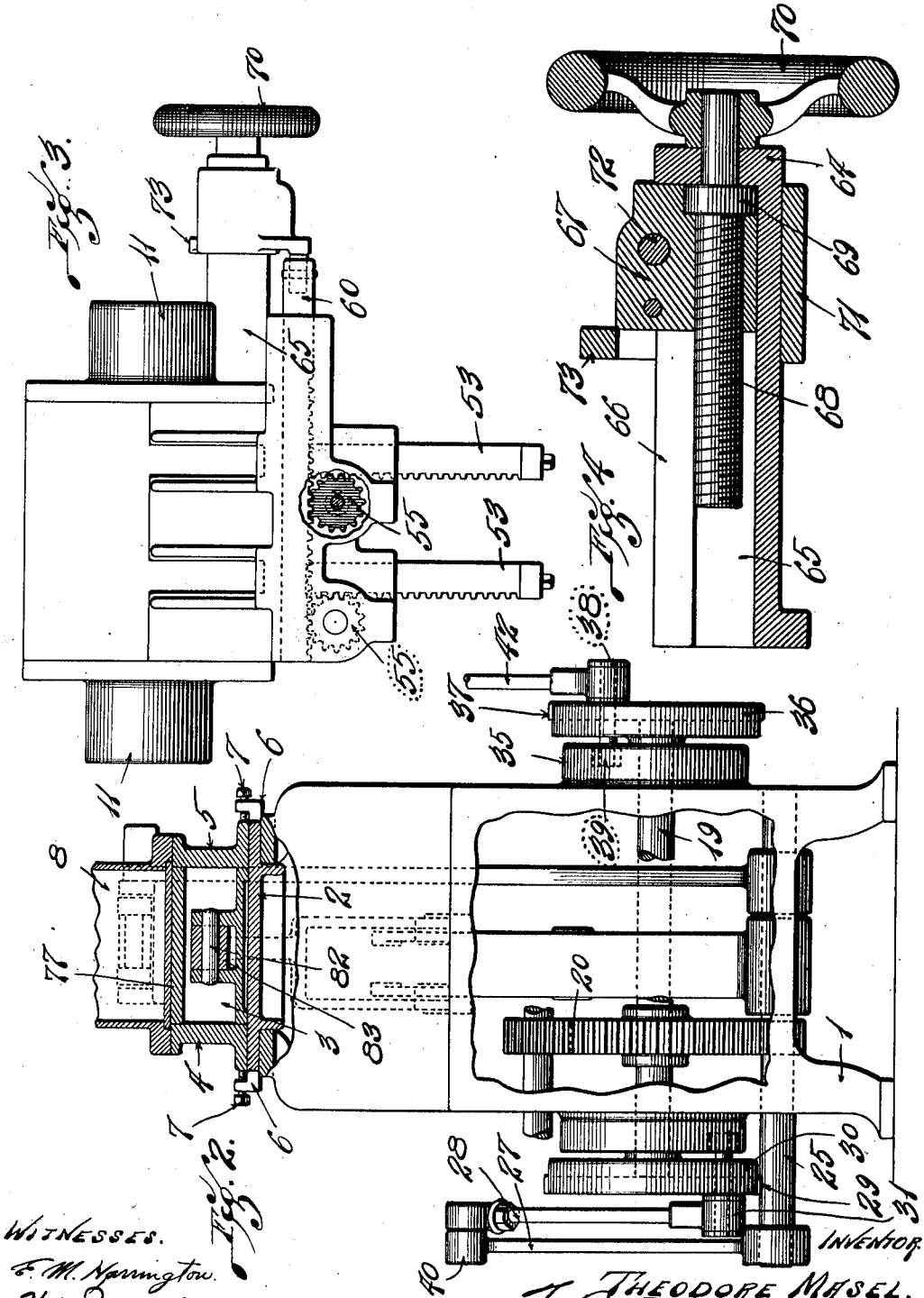

T. MASEL.
DOUGH DIVIDER.
APPLICATION FILED APR. 7, 1911.
1,021,157.
Patented Mar. 26, 1912.
4 SHEETS—SHEET 3.
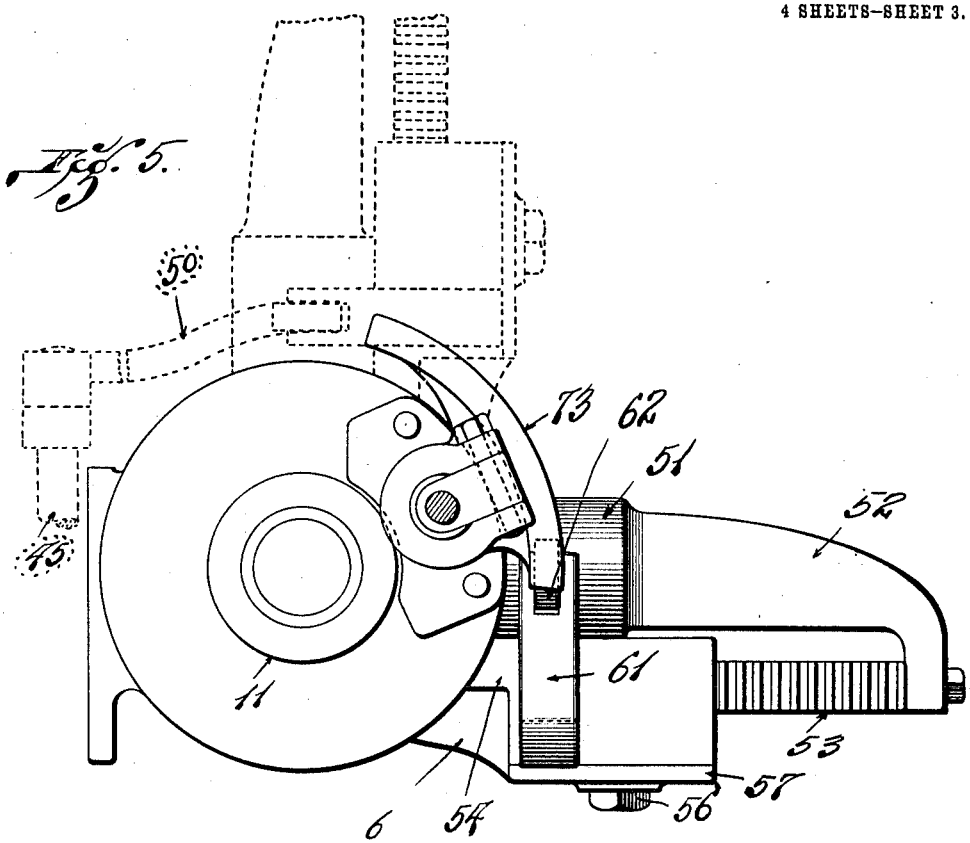
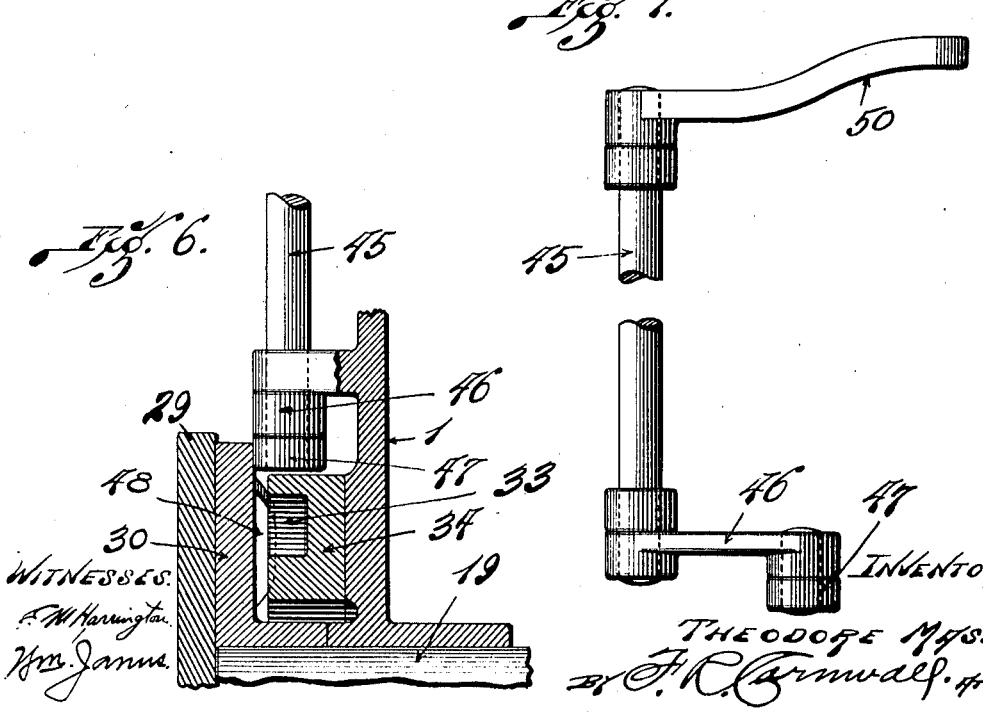

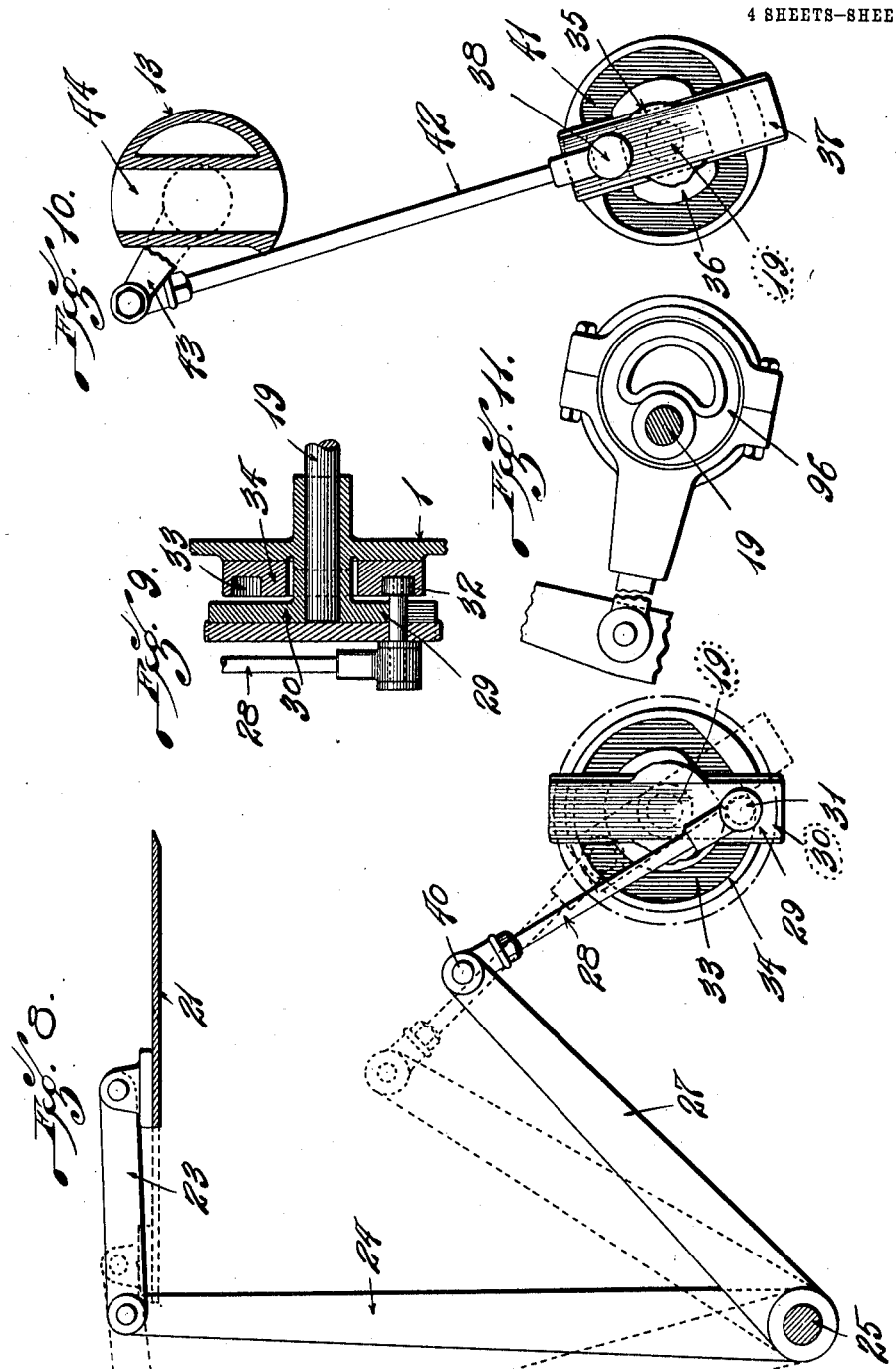

UNITED STATES PATENT OFFICE.

THEODORE MASEL, OF ST. LOUIS, MISSOURI, ASSIGNOR TO AMERICAN BAKER'S MACHINERY COMPANY, OF ST. LOUIS, MISSOURI.

DOUGH-DIVIDER.

1,021,157. Specification of Letters Patent. Patented Mar. 26, 1912.

Application filed April 7, 1911. Serial No. 619,586.

*To all whom it may concern:*

Be it known that I, THEODORE MASEL, a citizen of the United States, residing at St. Louis, Missouri, have invented a certain new and useful Improvement in Dough-Dividers, of which the following is a full, clear, and exact description, such as will enable others skilled in the art to which it appertains to make and use the same, reference being had to the accompanying drawings, forming part of this specification, in which—

Figure 1 is a general elevational view partly broken away, of my improved machine. Fig. 2 is a side elevational view also partly broken away. Fig. 3 is a plan view partly broken away to illustrate details of construction. Figs. 4 to 11 inclusive are detailed views of portions of my improved machine.

This invention relates to machines for dividing masses of dough, bread or similar materials into lumps of predetermined size or weight.

One object of my invention is to provide a simple form of equalizing device to be employed with the piston or plunger in a well-known form of dough divider.

Another object of my invention is to provide a new form of operating means for the dough cutter and also for the dough dividing or measuring chamber of the machine. Still other objects of my invention will appear in the description of my improved machine and afterward be pointed out in the accompanying claims.

The dough divider as illustrated is comprised generally of a hopper to receive the masses of dough to be divided mounted over a chamber into which the dough drops from the hopper and which chamber is in turn mounted on the top of a suitable frame, a cutter or knife acting to separate the portions of dough as they drop from the hopper into the chamber. In the chamber is mounted a reciprocating piston or plunger which forces dough into an oscillatory receptacle or measuring chamber from whence it is ejected at the proper time upon a suitable table or conveyer in the form of lumps of dough of the required weight.

Referring to the accompanying drawings: 1 indicates generally the frame of the machine. On top of this frame is mounted a plate 2 which forms the bottom of a chamber 3.

4 and 5 indicate the side walls of the chamber, one on each longitudinal edge of plate 2. The plate 2 is provided with upwardly projecting lugs 6 in which are mounted set screws 7 which bear against the lower flanges of the chamber sides 4 and 5 and are for the purpose of providing means to adjust the sides and to compensate for wear. On top of the chamber sides 4 and 5 rests the hopper 8 to receive masses of dough or other similar material to be divided.

One end of the chamber 3 is closed by a casting 9 comprising within itself a nozzle or a plurality of nozzles 10 and bearings 11 for trunnions 12 upon which an oscillatory head 13 is mounted, said head being of circular shape to fit within the casting 9. Lugs 14 on the casting 9 match similar lugs 15 on the hopper 8 and a pin 16 passes through these lugs to form a hinged joint around which the hopper can be swung whenever it is desirable to do so for cleaning purposes. Near the opposite end of the hopper 8 is a pin 17 adapted to engage with a latch 18 to hold the hopper down tightly against the top surfaces of the side walls 4 and 5.

Journaled within suitable bearings on the frame-work 1 is an operating shaft 19 adapted to be driven in any suitable manner as through intermeshing gearing 20.

A knife 21 is slidably mounted in a guideway 22 within the base of the hopper, said knife being connected by means of a link 23 to a lever 24 journaled by means of a shaft 25 in bearings 26 on the frame 1 on the opposite side thereof from the shaft 19. Shaft 25 is connected by means of a lever 27 to a link 28 which is pivoted on a dove-tail slide 29 slidably mounted within a suitable groove in a disk 30, this disk being rigidly mounted on the shaft 19. The pivot pin 31 in the end of the link 28 extends within an opening in the slide-way through a slot in the disk 30 and has a roller 32 at its extremity engaging in a cam groove 33 in a fixed disk 34 attached to the frame 1 of the machine surrounding the bearing for the shaft 19. Disks 30 and 34 together with the lever 27 and link 28 are positioned on the outside of the frame 1. At the opposite side of the frame is mounted on a shaft 19 a similar set of mechanism in which the disk fixed to the frame is marked 35 and the disk mounted on the shaft is designated 36 with a dove-tail slide block 37 mounted in a suitable groove therein. A pin 38 with roller 39 is similarly positioned to pin 31. The groove 33 in disk 34 is formed concentric with the shaft 19 for a considerable portion perhaps ⅚ of its length and the remaining portion or ⅙ is formed with a slight inward curvature toward the center of the disk 34 and this portion is concentric with the pivot 40 of the link 28 where connected to the lever 27. The groove 41 in the fixed disk 35 is provided with diametrically opposite portions concentric with shaft 19 and intermediate these first mentioned portions with curved portions concentric with a link 42 in two of its positions as will be later explained. Link 42 is connected to lever 43 mounted on one of the trunnions 12 to operate the oscillatory head 13. One portion of the groove 41 is made concentric with the pivotal point between the link 42 and the arm 43 when said arm 43 positions the oscillatory head 13 so that the dough divider or measuring chamber 44 within the head is positioned vertically and a diametrically opposite portion of the groove 41 is concentric with the pivotal point between the link 42 and the arm 43 when the head 13 is positioned with the dough dividing chamber 34 registering horizontally with the nozzle 10 and chamber 3. By this arrangement a dwell is produced in the movement of the head 13 when the chamber 44 is positioned to receive dough and also when it is in position to have dough ejected therefrom.

Mounted on bearings on the side of the frame 1 is a shaft 45 which has an arm 46 provided with a roll 47 at the end thereof. This roll bears against a side cam 48 on disk 30 attached to the shaft 19. This cam tends to oscillate shaft 45 in one direction and a spiral spring 49, which surrounds the shaft 45 and is attached thereto at one end and to the frame 1 at the other, tends to oscillate the shaft in the opposite direction. At its upper end the shaft 45 is provided with an arm 50 which acts upon an operating rack on the dough measuring chamber or receptacle to be hereinafter described.

The head 13 is preferably provided with a plurality of dough measuring chambers or receptacles 44. These chambers 44 communicate with the dough receiving chamber 3 through the nozzles 10 when the head is moved so that the chambers 44 are in horizontal position. The head 13 may be oscillated through the link 42 and operating means until the chambers 44 are placed in vertical position when the dough within these measuring chambers may be ejected therefrom by plungers 51, a plunger being mounted in each chamber. These plungers are preferably of a skeleton type both for lightness in weight and to reduce the surface contact with the walls of the chamber and have therefore a self-cleaning action. The plunger 51 is provided with an outwardly extending and turned arm 52 which is connected in any suitable manner with a rack bar 53, said rack bar having a bearing in a cast piece 54 attached to the head 13 and adapted to intermesh with a pinion 55. The pinion 55 is formed of substantially double the thickness of the rack 53 and is held in place within the cast piece 54 by means of a stud bolt 56 screwed within a plate 57 bolted to the cast piece 54 said stud extending with a smooth periphery 58 within the pinion 55 to act as a bearing therefor. Positioned in a suitable seat 59 in the cast piece 54 is a cross rack bar 60 extending at substantially right angles to the rack 53 within the seat 59, one side of the casting 54 being provided with an upwardly extending arm 61.

As illustrated in Fig. 3, and as is customary, the machine is provided with two or more chambers 44 in the oscillatory head 13, each chamber being provided with a pusher 51 operated by means of a rack 53 and pinions 55 as already described. The cross rack bar 60 is adapted to engage with all of the pinions 55 for operating all the racks 53 actuating the plungers 51. The arm 61 is provided with a roller 62 which is to be acted upon by the arm 50 previously described. When the parts are positioned as illustrated in dotted lines in Fig. 5, i. e. with the plungers or pushers 51 directed downwardly and the dough receptacle or measuring chambers 44 opening downwardly, the dough may be ejected therefrom by the movement of the plungers, upon any suitable form of conveyer or table 63 positioned underneath. At the side of the frame and adjacent the arm 61 is provided an adjustable stop member or guide. A cast bracket 63 is bolted to the side of a bearing for the oscillatory head 13 and so as to be fixed in position. This bracket has an upturned portion 64 and a grooved guide-way of substantially cylindrical shape 65 with a slot 66 in the periphery thereof. Within this slot is slidably mounted a nut 67 being internally threaded to engage a screw 68. This screw 68 is provided with a shoulder 69 adjacent flange 64 and on the outside of the flange with a hand wheel 70. The nut 67 is surrounded by a split member 71 which embraces also the cylindrical exterior of the bracket 63 and is provided with a clamping bolt 72 passed through the two sides of the split member 71 and through the nut 67. This member 71 has an extended curved flanged portion 73 with one face in position to contact with roller 62 on arm 61 while the head 13 is being oscillated. This curved portion 73 or stop member is of such length that it does not prevent the action of arm 50 when the oscillatory head is in vertical position shown in dotted lines in Fig. 5. This guide or stop 73 is provided to limit the retraction of the plunger or pusher 51 which is acted upon by the dough being compressed within the chamber 44 through means of a plunger or piston 74.

The plunger or piston 74 is mounted in a substantially rectangular chamber 3 and is formed in the shape of a casting having a front face 75 and guiding base 76 with a second cast piece guide member 77 bolted to the face 75. This face is formed with an inclined edge 78 and a cast piece 77 with an oppositely inclined face 79. A wedge piece 80 is positioned between the inclined surfaces 78 and 79 and connected by means of screw bolts 81 to the front piece 75. By this means the position of the cast piece 77 may be adjusted and the height of the plunger changed, it being understood that the bolt or bolts connecting the guide member 77 to the front piece 75 work in small slots to allow of this adjustment. The piston 74 is provided with a pivot pin 82 connected to a link 83 which is pivoted to an equalizing mechanism designated generally 84. This equalizing mechanism is comprised of a lever 85 rotatably mounted upon shaft 25. Adjacent its seat on the shaft it is provided with a bearing 86 for a sliding adjustable block 87, and is also threaded at 88 to receive an adjustment screw 89. The screw has a hand wheel 90 at its extremity and has collars 91 mounted thereon on either side of a projecting portion 92 of the block 87. By rotating the hand wheel the screw 89 is moved lengthwise impelled by the thread at 88 and thereby through collars 91 changes the position of block 87 in relation to arm 85. Block 87 at its lower extremity is provided with a hook-shaped end 93.

Pivoted to the lever 85 at 94 is an eccentric rod 95 operated by an eccentric 96 on shaft 19. The upper end of lever 85 is provided with a pivot pin 97 upon which is pivotally mounted a second lever 98 which lever has two arms 99 and 100 connected by a cross piece 101. Lever 85 is extended beyond the pivot pin 97 to form an irregular shaped cam surface 102 and also a stop member 103 which latter is adapted to bear against arm 100 of lever 98. Pivoted at 104, being the intersection of arms 99 and 101 of the lever 98, is a lever 105 having a roll 106 mounted in the extremity thereof to engage the cam surface 102. Connected to the lever 105 intermediate its ends is a rod 107 to which is attached in any suitable manner a tension spring 108. This spring is also attached to a rod 109 having a ring bolt 110 adapted to seat within the hook 93 of slide block 87.

The object of the equalizing mechanism 84 is to provide a means for operating plunger 74 in such a manner that the pressure exerted will at no time exceed a predetermined amount whatever excess of dough is cut off in the chamber 3 and which pressure is determined by and proportional to the initial tension given the spring 108. Normally levers 85 and 98 move in unison in a fixed relation to each other determined by stop 103 and kept in this position by the pull of spring 108 until such a time, as the resistance to plunger 74 overcomes the pull of the spring 108. At this moment the plunger will come to a stop and the eccentric 96 continuing to give movement inward to the pivot 97 will cause the double armed lever 98 to turn around the pivot 97 of arm 85 and raise pivot point 104. By raising 104 the link 105 is caused to move about the pivot due to the rolling action of the roll 106 on the cam surface 102. The cam surface 102 acting upon roll 106 increases the tension of spring 108 as the pivot point 97 moves inward toward the axis of the spring and this increase in tension of the spring is exactly proportional to the decrease in the distance between the pivot point 97 and the axis of the spring 108. Necessarily the opposite effect takes place when the lever 85 and therefore pivot pin 97 is moved in the opposite direction, i. e. away from the spring 108. The tension of the spring 108 is decreased as the distance from pivot pin 97 to the axis of the spring is increased. In other words the stress or power exerted by the spring 108 is increased as the amount of the force exerted on lever 98 is decreased and vice versa, the proportion in increase and decrease being such that the maximum predetermined pressure on the plunger 74 is always the same, which is a decided advantage in machines of this character, where varying amounts of dough are to be acted upon and an excessive compression of the dough by the plunger is injurious.

The operation of my machine is as follows: The dough is placed within the hopper 8 and when the cutter 21 is retracted part of the dough drops into chamber 3 in front of plunger 74, the operating parts being timed to retract the plunger in advance of the retraction of the cutter. The cutter 21 is then moved forward to separate the dough in the chamber 3 from that in the hopper 8 and the plunger 74 operated immediately afterward to compress the dough and push it through the nozzle 10 into the dough receiving chambers or receptacles 44. By this movement of the dough the plungers or pushers 51 are retracted until the cross bar rack 60 with arms 61 engages the stop 73 which determines the amount of dough to be placed within the chamber 44. The head 13 containing the chambers 44 is then oscillated and when it arrives in the vertical position shown in dotted lines in Fig. 5 the roll 62 on arm 61 is in position to be acted upon by the arm 50 which actuates the plungers 51 to eject the dough from chambers 44 upon the table or conveyer 63.

The advantages of the equalizing mechanism 84 have already been stated but it should be noted that the initial tension of spring 108 may be changed by adjustment of the block 87. The slide block and cam construction for the purpose of operating the cutter 21 and the oscillating head 13 is of especial advantage in this type of machine for the reason that it combines the advantages of a cam operated part and a crank operated part and avoids their disadvantages. The cam operating knife 21 is provided with a groove which causes a dwell in the operation of the knife when in forward position due to the fact that the groove is concentric with the operating link at this time. The groove in the cam disk for operating the oscillatory head 13 is arranged to actuate the operating link 42 quickly and to cause a dwell in the movement when the chamber 44 is in register with chamber 3 and also when this chamber 44 is in a vertical position to eject material therefrom.

I am aware that minor changes may be made in the construction and arrangement and combination of the elements of my machine, as herein shown and described, without departing from the nature and spirit of my invention, the scope of which is indicated in the accompanying claims.

I claim:

1. In a dough divider having a hopper and a chamber beneath the hopper, the combination with a knife operating between the hopper and the chamber, and means for operating said knife comprising a disk having a cam groove, a coöperating disk and connecting means extending from said latter disk within the groove in the first mentioned disk.

2. In a machine of the character described, the combination with a knife, of a lever for operating said knife, a means for actuating said lever comprising a disk having a cam groove therein, a coöperative disk having a slide block mounted thereon and connecting means extending from said block within the groove in the first mentioned disk.

3. In a machine of the character described, the combination with a knife and lever for operating said knife, of a link connected with said lever at one end, a disk rotatably mounted having a sliding block fitted therein connected to said link, a second disk having a cam groove and means for connecting the said block with the said cam groove.

4. In a machine of the character described, the combination with a knife and lever for operating said knife, of a link connected with said lever at one end, a disk rotatably mounted having a sliding block fitted therein connected to said link, a second disk having a cam groove with a portion concentric with the disk and a portion concentric with the link in one position thereof and means for connecting the said block with the said cam groove.

5. The herein described dough divider provided with a hopper, and chamber beneath the hopper, the combination with an oscillatory head having a dough receiving chamber, of means for oscillating said head comprising a rotating disk, a coöperating disk having a cam groove therein and means connecting said rotating disk with said cam groove.

6. In a machine of the character described, the combination with an oscillatory dough receiving chamber, of means for oscillating said chamber comprising a rotating disk, a slide block mounted on said disk, a coöperating disk having a cam groove and means connecting said slide block with said cam groove.

7. In a dough divider provided with a hopper, a chamber beneath said hopper, and a plunger mounted in said chamber, the combination with a dough receiving chamber communicating with said first mentioned chamber, of means for oscillating said dough receiving chamber comprising a link, a slide bar attached to said link, a rotating disk upon which said slide bar is mounted to move, a coöperating disk having a cam groove and a pin extending from said slide bar within the groove in the latter disk.

8. In a machine of the character described, a plunger, equalizing means for operating said plunger comprising a shaft, a lever directly connected to said shaft to be operated thereby, a second lever connected to said first lever and resilient means for operating said second lever independently of the first mentioned lever.

9. In a machine of the character described, a plunger, a link connected thereto, an operating shaft, a lever operated thereby, a second lever connected to the first and connected to said link and a tension spring attached to said second lever at one side of the fulcrum, and also attached to the first mentioned lever.

10. In a machine of the character described, a plunger, a link connected to said plunger, a main operating shaft, a lever operatively connected to said shaft, a second lever pivoted to the first and connected to said link, said second lever being provided with a laterally projecting arm, a link pivoted to said arm, a tension spring connected to said link and to said first mentioned lever.

11. In a machine of the character described, a plunger, a link connected to said plunger, an operating shaft, a lever connected to be operated thereby having a cam surface at one extremity, a second lever pivoted to the first and connected to said link, an arm pivoted to said second lever having a roller at one end adapted to bear on the cam surface of the first mentioned lever and a tension spring connected to said arm.

12. In a machine of the character described, a plunger, a link connected to said plunger, an operating shaft, a lever connected to said shaft, a second lever pivoted to said first mentioned lever and connected to said link and a spring intermediate said levers and means on the first mentioned lever adapted to increase the tension of the spring proportionately as the distance from the spring to the fulcrum of the second mentioned lever decreases.

13. In a machine of the character described, a plunger, a link connected thereto, an operating shaft, a lever operated thereby, a second lever pivoted to the first and connected to the link, a spring connecting said levers adapted to move the second lever above its fulcrum on the first lever and means regulating the pressure of the spring as the distance between the fulcrum and the spring is changed.

14. In a machine of the character described, a plunger, a link connected thereto, an operating shaft, a lever operated thereby, a second lever pivoted to the first and connected to the link, a spring connecting said levers adapted to move the second lever about its fulcrum on the first lever, means regulating the pressure of the spring as the distance between the fulcrum and the spring is changed and means for adjusting the initial tension of the spring.

15. In a machine of the character described, a plunger, an operating shaft, a two-part lever intermediate said operating shaft and said plunger, a spring acting between the two parts of the lever to move one lever about the other and a means for adjusting the initial tension of the spring.

16. In a machine of the character described, a plunger, an operating shaft, a two-part lever intermediate said operating shaft and said plunger, a spring acting between the two parts of the lever to move one lever about the other, means for adjusting the initial tension of the spring said means comprising an adjustable block attached to one end of the spring and slidably mounted on the lever.

In testimony whereof I hereunto affix my signature in the presence of two witnesses, this 4th day of April, 1911.

THEODORE MASEL.

Witnesses:
MARTIN P. SMITH,
B. L. CROWLEY.

Copies of this patent may be obtained for five cents each, by addressing the "Commissioner of Patents, Washington, D. C."